United States Patent Office 3,211,165
Patented Oct. 12, 1965

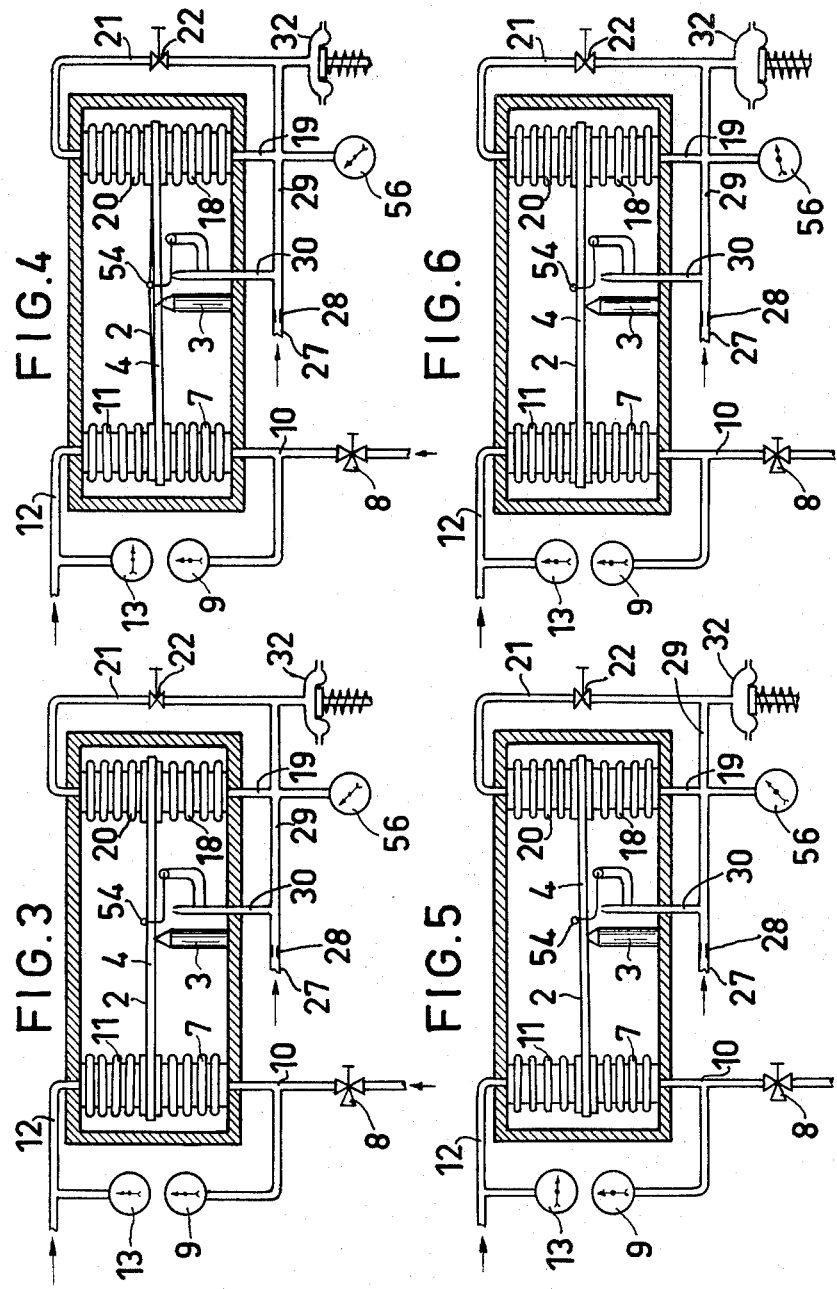

3,211,165
FLUID PRESSURE OPERATED CONTROL APPARATUS
Johannes Gerhard Jansson, Stockholm, Sweden, assignor to AB A. Ekstroms Maskinaffar, Stockholm, Sweden, a Swedish joint-stock company
Filed Feb. 5, 1963, Ser. No. 256,382
Claims priority, application Sweden, Feb. 10, 1962, 1,490/62
7 Claims. (Cl. 137—86)

In control devices wherein pressure fluid such as compressed air is employed as an operating medium, the pressure fluid usually actuates diaphragms or metal bellows, which are in turn adapted to actuate levers, spring means, valves etc. in order to effect the desired control of a process to be regulated.

Typically such a control device receives air pressure impulses or signals from a transmitter means that is responsive to changes in the value of a variable in the process to be controlled. Depending upon the value which it senses, the transmitter means delivers to the control device air pressure impulses which may vary between 0.2 and 1.0 kg./cm.$^2$, and in response to such input impulses the control device delivers to an actuator output signal impulses which may also vary between 0.2 and 1.0 kg./cm.$^2$. The actuator, which is arranged to influence the particular process value being controlled, of course responds to the output signals from the control device in a manner and in a sense to maintain a substantially constant and desired value of the variable to which the transmitter means responds.

The relation between the impulse arriving from the transmitter means and the signal going out to the adjusting means is called the "proportional band." The value of the "proportional band" is expressed in terms of percentage, in such a manner, that when the entire input impulse, 0.2–1.0 kg./cm.$^2$, corresponds to the entire output signal 0.2–1.0 kg./cm.$^2$, the "proportional band" is 100 percent. When, however, half of the input impulse, for example 0.3–0.7 kg./cm.$^2$, corresponds to the entire output signal 0.2–1.0 kg./cm.$^2$, the "proportional band" is 50 percent. When the entire input impulse 0.2–1.0 kg./cm.$^2$ corresponds to half of the output signal, for example 0.4–0.8 kg./cm.$^2$, the "proportional band" is 200 percent, and so on. The "proportional band" may thus be calculated from 0–∞ percent.

If the input impulse deviates from that corresponding to the desired control value, the control device responds by emitting an output signal which is proportional to the size of the deviation and which depends on the setting of the proportional band. Too narrow a proportional band causes overcontrol which results in never-ending oscillation. If the band is too wide, a deviation of the impulse from the desired value will persist, but without oscillation.

In order to make the input impulse resume the desired value, the control device is usually provided with a device for automatic readjustment (integral effect) which effects an additional alteration of the outgoing output signal beyond the proportional one. The said readjustment device is adjustable according to a time scale which for a proportional band close to ∞ and for a maximum impulse indicates the time needed by the output signal to go from minimum to maximum or vice versa.

In control situations where a long time elapses between the alteration of the process and the emission of a changed input signal by the transmitter means, the control device must be provided with a device adapted to effect instantaneous overcontrol (derivative effect), in order to maintain the datum for the process within reasonable limits. Such an overcontrol device can likewise be adjustable according to a time scale, thereby rendering it possible to determine the duration of the overcontrol. The size of the overcontrol is proportional to the speed at which the input impulse deviates from the desired value.

When the control situation is of a more complicated nature, as where the individual variables in the process are not constant or representative for the situation in question, it may be necessary to let the control device be actuated by several impulses. As an example may be mentioned the firing control of a steam boiler for maintaining the steam pressure constant. Upon an increase of the amount of steam drawn from the boiler, the pressure will not fall immediately, due to the large heat content of the water volume. In such a case, a flow transmitter may be mounted in the steam line, adapted to give a so-called disturbance signal to the control device. The effect of this signal must, of course, be limited in time, in view of the fact that gradually the control device will receive the main signal from the steam pressure variations.

The device provided in the control device for controlling the output signal is in almost all cases a so-called nozzle apparatus which operates as follows.

Air of constant pressure (for example 1.4 kg./cm.$^2$) is fed through a small throttling restrictor (for example 0.2–0.3 mm. in diameter) to an exhaust nozzle having a cross-sectional area which is several times as great (for example 0.8–1.2 mm. in diameter). Thus, the pressure in the line between the throttling restrictor and the nozzle will be approximately zero when the nozzle is open. By keeping the exhaust nozzle more or less closed, by means of a covering flap or tongue, it is possible by extremely small movements of the flap or tongue (some $\frac{1}{100}$ mm.) to vary the pressure directly ahead of the nozzle between zero and the maximum value of the pressure supplied to the throttling restrictor.

By effecting either force unbalance or motion unbalance, variations of the impulse transmitted to the control device bring about a change in the position of the tongue in relation to the nozzle. As mentioned, this change in the position of the tongue results in a change of the air pressure ahead of the nozzle. The air pressure which constitutes the output signal of the control device must also actuate the control device, so that balance is reestablished.

This invention relates to a control device which comprises a swingable plate actuated by a number of pressure bellows, and a nozzle which upon being closed effects increase in a pressure that is utilized as an output signal. The said control device is substantially characterized in that it comprises a point connection between an edge portion of the plate and a flapper valve that is swingable toward and from the nozzle to vary the amount of fluid issuing therefrom, and means providing for adjusting displacement of the nozzle and flapper valve lengthwise relative to said edge portion of the plate, the said plate being mounted for flatwise swinging motion about a fixed point spaced from said edge of the plate.

In the foregoing, reference was made to a desired measured value which should be maintained constant. If there is no change, no control device is needed. Operation of a control device requires a certain deviation from the desired value. The value may, therefore, be given two designations, viz. "desired value" and "actual value." In order to simplify the description of the control device, these two designations will be used hereinafter.

The invention is illustrated in greater detail in the following, reference being had to the accompanying drawings showing by way of example an embodiment of a control device according to the invention.

FIGS. 3–6 are more or less diagrammatic views, all taken on the same vertical section through the control device, illustrating the successive movements of the balance plate in accordance with alteration of the value controlled by the control device.

Figure 1:
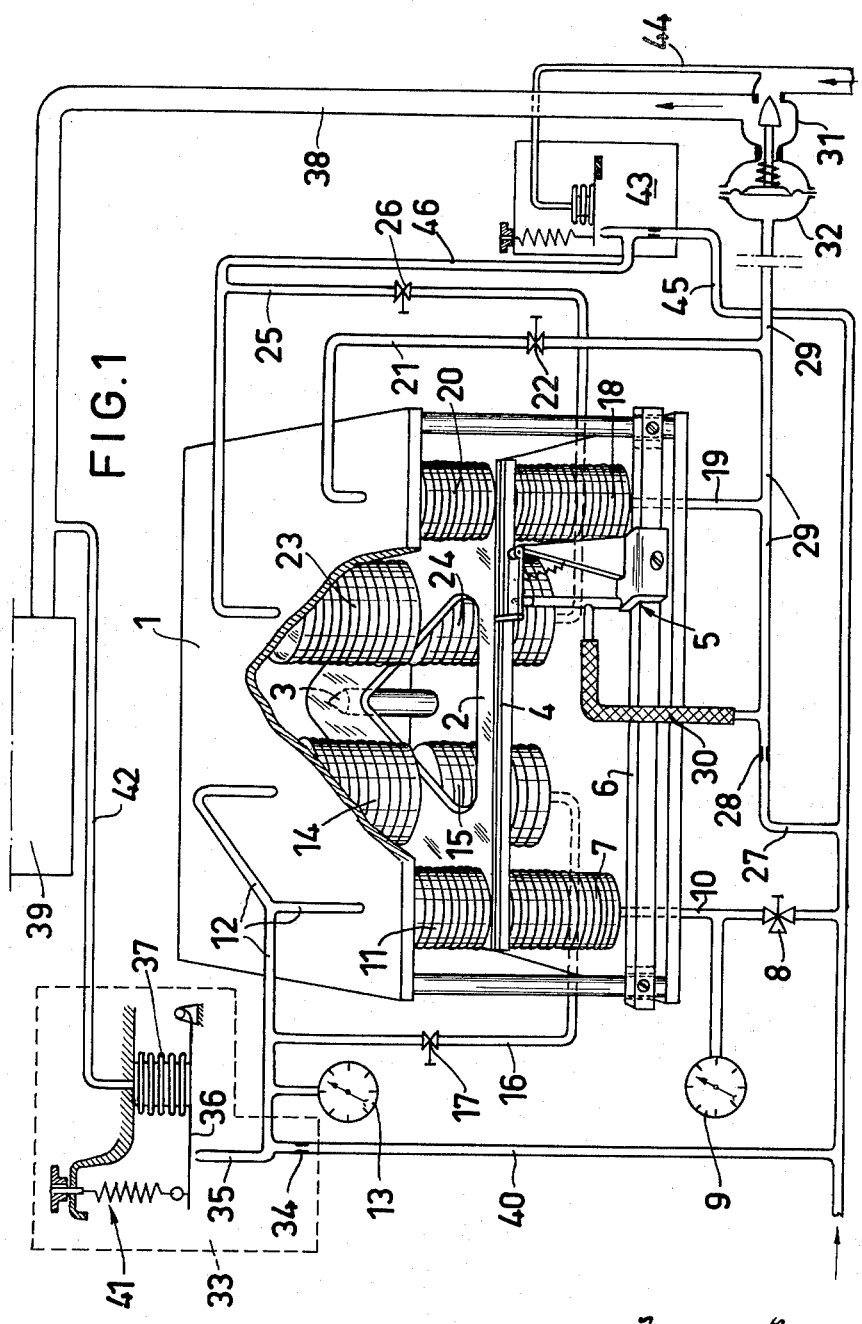
FIG. 1 is a perspective view of the control device, with portions broken away, more or less diagrammatic, the lines and control means connected therewith being shown schematically.

As appears from FIG. 1, the governor comprises a housing 1 enclosing a triangular plate 2 mounted for flatwise swinging motion in all directions about a fixed point defined by the tip of a mounting post 3. A straight edge 4 in rigid connection with the plate 2 and extending along an edge thereof spaced from the post 3 is arranged for cooperation with a nozzle apparatus 5 mounted on a bar 6. The bar 6 is adapted to be adjusted both with respect to its distance from and its angular relation to the straightedge 4 and the nozzle apparatus is adjustably moveable back and forth along the bar. A "desired value" bellows 7 is so arranged that it receives, through a line 10 provided with an adjusting valve 8 and a pressure gauge 9 for the "desired value," a pressure corresponding to the value to be maintain by the control device. A pressure corresponding to the actual existing value is directed to an "actual value" bellows 11 through a line 12 provided with a pressure gauge 13 for the "actual" value. The control device further comprises derivative effect bellows 14 and 15 with a connecting line 16 and a valve 17 mounted therein for setting the derivation period, further a return (proportioning) bellows 18 which is connected by lines 19 and 21 and by a valve 22 mounted in line 21 for setting the integration period, with an integrating bellows 20, and further bellows 23 and 24 for disturbance value connection, the last mentioned bellows being connected with each other by a line 25 which is provided with a valve 26 for setting the period during which the disturbance is effective. Pressure air is supplied to the control device through a supply line 27, and passes through a throttling restrictor 28 and a hose 30 to the nozzle apparatus 5 wherein a pressure responsive to the adjustment of plate 2 is built up and emitted from the control device as an output signal through a line 29.

The control device shown in FIG. 1 is a pressure reducing controller. For this reason, a pressure reducing valve 31 is shown which is provided with a conventional diaphragm member 32. A pressure converter 33 (schematically shown), which can be regarded as an input signal transmitter, is connected to the actual value line 12 and comprises a nozzle apparatus 34, 35, 36 actuated by a bellows 37 which in its turn is actuated through a line 42 by the pressure in a steam line 38 between the reducing valve 31 and a steam consumption unit 39. The pressure converted 33 is supplied with pressure air through a line 40 and is adjustable by a spring means 41. A similar pressure converter is connected by a line 44 with steam line ahead of the reducing valve 31 to produce input signals corresponding to the unregulated pressure in the steam line. The pressure converter 43 is supplied with pressure air through a line 45 and emits its input signals through a line 46 to the connecting line 25.

Figure 2:
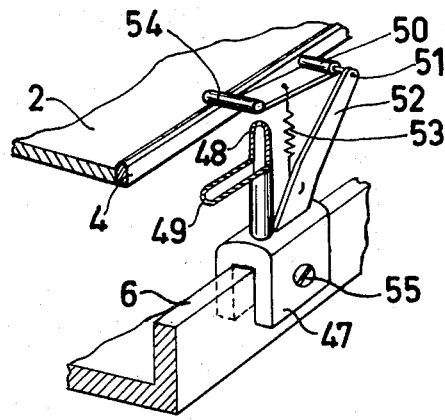
FIG. 2 is a perspective view on an enlarged scale of a detail of the device shown in FIG. 1.

FIG. 2 shows the nozzle apparatus 5 with part of the triangular plate 2, straightedge 4 and bar 6. The apparatus comprises a slide 47, an exhaust nozzle 48 and a supply pipe 49 to the nozzle which are both mounted on the slide 47, and a cover flap or tongue 50 mounted on a pin 51 secured on a bracket 52 which is likewise fixed to the slide 47. A tension spring 53 connected between the tongue and the slide tends to press the tongue 50 against the nozzle 48. By means of a lifting pin 54 secured on the tongue 50 at the free end thereof and projecting over the upper edge of the straightedge, the straightedge 4 can lift or lower the tongue in relation to the nozzle. The position of the slide 47 on the bar 6 can be fixed by a stop screw 55. Note that the pin and straightedge cooperate to provide a point connection between the tongue and the edge portion of the plate along which the straightedge extends.

FIGS. 3, 4, 5 and 6 show by turns the different phases in a complete proportional integrated control cycle. For reasons of simplicity, the bellows 14, 15, 23 and 24 are not included, nor is there shown any datum converter or any process being controlled. The figures include, however, a pressure gauge 56 for the signal going out from the control device to the diaphragm member 32.

*Mode of operation*

FIG. 3 shows the control device in starting position. By means of the valve 8 the bellows 7 is supplied through line 10 with a certain desired value pressure which can be read from gauge 9. The datum converter (not shown) delivers through line 12 to bellows 11 an actual value pressure which is assumed to be of the same magnitude as the desired value and can be read from gauge 13. As long as the "actual" and "desired" values are of equal magnitudes, plate 2 is not actuated by the said bellows, but remains in central position.

Air of constant pressure is supplied through line 27. The air passes through the throttling restrictor 28 and enters the line 29 from where it continues through hose 30 to the nozzle apparatus 5, further through line 19 to bellows 18, through valve 22 and line 21 to bellows 20, and to the diaphragm member 32. The pressures in the bellows 18 and 20 are assumed to be equal, because they are balanced through line 21 and valve 22 which is somewhat open. Hence neither of these two bellows actuates plate 2 to any direction, but plate 2 remains in central position. In this central position, the height of the nozzle apparatus is so adjusted that, via the straightedge 4 and the lifting pin 54, the tongue is maintained at just that small distance from the nozzle which is required for maintaining a small definite pressure in line 29. This pressure can be read from gauge 56. The diaphragm in the diaphragm member 32 assumes a position which is determined by the pressure in line 29.

FIG. 4 assumes that the "actual" value from the datum converter through the line 12 has increased (gauge 13). Due to the increase in pressure, the bellows 11 which receives the actual value is lengthened, bellows 7 is pressed together, and plate 2 has rocked downwards to the left. The straightedge 4 is now in such a downward position that the lifting pin 54 is located somewhat above the straightedge, and the tongue abuts downwards against the nozzle. In the absence of any exhaust through the nozzle, the pressure in line 29 commences to increase, and at the same time pressure increases in the bellows 18 and the diaphragm member 32. FIG. 5 assumes that the pressure in bellows 18 has increased so much that the right-hand end of plate 2 has been raised to the extent that the straightedge 4 via pin 54 has lifted the tongue slightly off the nozzle, thereby preventing further increase of pressure in line 29. In the diaphragm member the pressure has likewise increased and, as shown, the diaphragm has moved slightly downwards. The displacement of the diaphragm member is proportional to the actual value deviation (see gauge 56). From the described sequence it is easy to understand that the movement to be carried out by the right-hand end of the straightedge in order to return the tongue to starting position (some 1/100 mm. from the nozzle) depends on where between the pairs of bellows the nozzle apparatus is located. The proportional band is, thus, adjusted by moving the nozzle apparatus to the left (narrower band) or to the right (wider band). It is understood by implication that the movement of the diaphragm member 32 affected the process being controlled in such a manner that further actual deviation was prevented. The pressure now prevailing in line 29 exceeds the pressure in bellows 20. As a result thereof, air will be blown through valve 22 and line 21 to bellows 20 in order to increase the pressure therein. Due to the increase in pressure in bellows 20, the right-hand end of plate 2 is pressed downwards, straightedge 4 again releases the tongue to move downwards against the nozzle, the pressure in bellows 18 is further increased and the diaphragm member at the same time moves downwards to further affect the process. During all this time the pressure in bellows 20 increases and thus forces the pressure in bellows 18, line 29 and diaphragm member 32 to increase. Thereby, the process being controlled is finally affected to such a degree that the "actual value" is reduced to "desired value." The control device has integrated to diaphragm member 32 the output signal required for the new process situation. At the same time that the "actual value" of the process is brought to the desired value, the pressures in bellows 18 and 20 became equal, provided that the valve 22 has been set to the right time factor. Otherwise, the process will perfor some oscillations before it will be stabilized. FIG. 6 shows the control device stabilized as in FIG. 3, with the difference, however, that the output signal is higher and the diaphragm member is in a different position. If the "actual value" of the pressure decreases, the control cycle would be repeated in the opposite direction, with the pressure relationship in the bellows being the reverse.

Referring to FIG. 1, the derivative effect may be described as follows:

The actual value pressure is led both to bellows 11 and bellows 14. Bellows 14 is connected with bellows 15 via line 16 and valve 17, the latter being adjustable to be more or less open. If the change in the actual value occurs slowly, the pressures in the bellows 14 and 15 will be balanced as rapidly as the change in the actual value occurs, and they will be of no effect in tilting the plate 2. If the actual value changes rapidly, the pressure in bellows 14 will instantaneously exceed the pressure in bellows 15. Bellows 14 thus helps bellows 11 in pressing plate 2 downwards. This downward movement will be of greater size than the movement effected by bellows 11 alone. As a result thereof, the increase in pressure in bellows 18 must be greater than normal in order to return the tongue to its normal position. The outgoing signal to the diaphragm member will likewise be greater, so that an overcontrol is produced which is the greater the quicker the actual value deviates. The said overcontrol remains only for the time required for balancing the pressures in the bellows 14 and 15, which time in its turn depends on how much valve 17 is opened.

The function of the disturbance value bellows pair 23, 24 may be described in about the same manner as the aforedescribed derivation function, with the difference, however, that the input signal does not originate from the process proper, but from a variable therein. One may even say that the disturbance value function constitutes a pre-correction of what will happen. In the control example shown in FIG. 1, a steam consumption unit is indicated at 39. If there is a rapid rise or fall in steam consumption, the derivative effect of such change in consumption will result in a correction to maintain the desired value of pressure change in line 38. If however the steam consumption unit has a large volume, a change in pressure ahead of the control valve 31 will not immediately influence the pressure in line 38. The datum converter 43, however, will immediately give a signal through line 46 to bellows 23, which bellows then instantaneously actuates the nozzle apparatus by causing the plate 2 to assume a position which tilts straightedge 4, in order to produce a higher or lower pressure in bellows 18 and diaphragm member 32. The effect of the disturbing signal depends on how much the valve 26 is opened for balancing the pressure between bellows 23 and 24.

Both the derivative effect and the disturbance value function may be connected in a reverse manner, thus having a damping effect on the control process instead of the reinforcing effect described above.

Thanks to the triangular plate which is pivoted at one corner, the control device according to the invention may, theoretically, be provided in every line with any number of pairs of bellows. In view of the fact that the proportionality band is adjusted along a straight line, and as the straightedge 4 at equal "actual" and "desired" values lies in parallel with bar 6, at least one additional nozzle apparatus may be mounted on the bar in order to produce some specially desired effect.

The invention has been described above with reference to its application to a pneumatic control device, but it may, of course, in principle, be applied to a hydraulic controller.

What I claim is:

1. A fluid pressure operated controller of the type comprising a plurality of pressure responsive elements connectable with input signal pressure producing means, a movable balance member against which said pressure responsive elements react, and means for producing output pressure signals in response to movement of said balance member and which correspond to a predetermined function of input pressure signals fed to the several pressure responsive elements, said controller being characterized by the following:
  (A) the balance member comprises a plate having a straight edge portion and which is mounted for flatwise tilting motion in all directions about a fixed point spaced from said edge of the plate;
  (B) the pressure responsive elements react upon the plate at points spaced from said fixed point; and
  (C) said means for producing output pressure signals comprises
    (1) a bar extending substantially parallel to said edge of the plate,
    (2) a member adjustably slideable along said bar,
    (3) a nozzle carried by said slideable member and communicable through a throttling restrictor with a source of fluid under pressure,
    (4) a valve element carried by said slideable member for movement to and from blocking relationship to the outlet of said nozzle,
    (5) means slideable with said slideable member along said edge portion of the plate providing a point connection between said edge portion of the plate and the valve element whereby the instantaneous position of the valve element relative to the nozzle outlet is accurately established in response to tilting displacement of the plate, and
    (6) means communicated with the nozzle downstream from the throttling restrictor for conducting fluid from the nozzle to an actuator at pressures which reflect the instantaneous position of the valve element.

2. In a fluid pressure operated controller of the type comprising a plurality of pressure responsive expansible elements into which varying fluid pressures are fed as input signals, a nozzle connectable through a throttling restrictor with a source of fluid under pressure, and output signal means communicated with said nozzle between its outlet and the flow restrictor for connecting the nozzle with an actuator which is responsive to variations in fluid pressure in the nozzle, means for varying fluid pressure in the nozzle in accordance with a predetermined function of the fluid pressure input signals fed to the several expansible elements, said last named means comprising:
  (A) a balance plate mounted for flatwise tilting motion in all directions about a fixed point that is spaced from one edge of the balance plate, said balance plate having the several expansible elements engaged therewith at points spaced from said fixed point so that the attitude of the balance plate, and hence the position of every point on said edge thereof, at every instant corresponds to a predetermined function of the fluid pressures fed into the expansible elements;

(B) means mounting the nozzle adjacent to said edge of the balance plate;

(C) a valve element mounted adjacent to the nozzle for movement in opposite directions toward and from the nozzle outlet; and (D) means providing a connection between the valve element and the balance plate at a point near said edge of the plate whereby movements of said last named point control movements of the valve element toward and from the nozzle outlet.

3. The controller of claim 2, further characterized by the fact that said means mounting the nozzle adjacent to said edge of the balance plate comprises:

(A) an elongated bar extending substantially parallel to said edge of the balance plate, and (B) a carrier element adjustably slideable along said bar, on which the nozzle is mounted and by which the valve element is movably carried, said carrier element thus providing for adjustment of the proportional band of the controller.

4. The controller of claim 3, wherein said valve element comprises an elongated tongue-like flapper that is pivoted at one end for flatwise movement toward and from the nozzle outlet, further characterized by the fact that said connection means comprises:

(A) straightedge means providing a substantially sharp edge portion projecting above the plane of the plate and extending along said one edge thereof;

(B) a spring reacting between the valve element and the carrier element to bias the valve element toward the nozzle outlet; and (C) a pin on the other end of the valve element projecting laterally therefrom and overlying said edge portion of the straightedge means to have point contact therewith.

5. The controller of claim 2, further characterized by the fact that said expansible elements are arranged in pairs, with the two expansible elements of each pair reacting against a common point on the plate from opposite sides thereof.

6. The controller of claim 5, further characterized by the following:

(A) the expansible elements of a first pair thereof comprise (1) an expansible element communicated with a source of fluid at a pressure corresponding to a desired value of a variable to be maintained by the controller, and (2) an expansible element communicated with a source of fluid at a pressure which corresponds to the instantaneous regulated value of said variable;

(B) the expansible elements of a second pair thereof comprise (1) an expansible element communicated with said output signal means to be responsive to variations in fluid pressure at the nozzle, and (2) an expansible element communicated with said output signal means through a throttling restrictor so as to cooperate with its paired expansible element in producing a response which is a function of the rate of change of fluid pressure in said output signal means; and (C) the expansible elements of a third pair thereof comprise (1) an expansible element communicated with said source of fluid at a pressure which corresponds to the instantaneous regulated value of said variable, and (2) an expansible element communicated through a throttling restrictor with the last mentioned source of fluid so as to cooperate with its paired expansible element in producing a response that is a function of the rate of change of the regulated value of said variable.

7. The controller of claim 6, further characterized by: a fourth pair of expansible elements comprising (1) an expansible element communicated with a source of fluid at a pressure which corresponds to the instantaneous unregulated value of said variable, and (2) an expansible element communicated through a throttling restrictor with the last mentioned source of fluid so as to cooperate with its paired expansible element in producing a response which is a function of the rate of change of the unregulated value of said variable.

References Cited by the Examiner

UNITED STATES PATENTS

| | | | |
|---|---|---|---|
| 2,626,787 | 1/53 | Harper | 137—82 X |
| 2,677,385 | 5/54 | Markson | 137—86 |
| 2,742,917 | 4/56 | Bowditch | 137—86 |
| 2,743,710 | 5/56 | Shannon | 137—86 X |
| 2,972,443 | 2/61 | Watrous | 137—85 X |

ISADOR WEIL, *Primary Examiner.*

WILLIAM F. O'DEA, *Examiner.*